(12) United States Patent
Takahashi

(10) Patent No.: US 12,731,869 B2
(45) Date of Patent: Sep. 8, 2026

(54) SECONDARY BATTERY, ELECTRONIC EQUIPMENT, AND ELECTRIC TOOL

(71) Applicant: MURATA MANUFACTURING CO., LTD., Kyoto (JP)

(72) Inventor: Masashi Takahashi, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 582 days.

(21) Appl. No.: 18/216,152

(22) Filed: Jun. 29, 2023

(65) Prior Publication Data

US 2023/0344094 A1 Oct. 26, 2023

Related U.S. Application Data

(63) Continuation of application No. PCT/JP2022/001903, filed on Jan. 20, 2022.

(30) Foreign Application Priority Data

Jan. 29, 2021 (JP) ................................ 2021-012618

(51) Int. Cl.
*H01M 50/538* (2021.01)
*H01M 4/70* (2006.01)
*H01M 10/0587* (2010.01)

(52) U.S. Cl.
CPC .......... *H01M 50/538* (2021.01); *H01M 4/70* (2013.01); *H01M 10/0587* (2013.01)

(58) Field of Classification Search
CPC ... H01M 50/538; H01M 4/70; H01M 10/0587
See application file for complete search history.

(56) References Cited

U.S. PATENT DOCUMENTS

2010/0046144 A1 2/2010 Miura
2011/0183170 A1* 7/2011 Kwak .............. H01M 10/0431 429/94

(Continued)

FOREIGN PATENT DOCUMENTS

JP H11219720 A 8/1999
JP 2007335156 A 12/2007
WO 2008072511 A1 6/2008

OTHER PUBLICATIONS

International Search Report of corresponding PCT application PCT/JP2022/001903, dated Mar. 22, 2022.

(Continued)

*Primary Examiner* — Olatunji A Godo
(74) *Attorney, Agent, or Firm* — K&L Gates LLP

(57) ABSTRACT

A secondary battery achieves a reduced internal resistance. The secondary battery includes an electrode wound body, a positive electrode current collector plate, and a battery can. The electrode wound body has a structure in which a positive electrode having a band shape and a negative electrode having a band shape are stacked with a separator interposed therebetween. The battery can contains the electrode wound body and the positive electrode current collector plate. The positive electrode includes, on a positive electrode foil having a band shape, a positive electrode active material covered part covered with a positive electrode active material layer, and a positive electrode active material uncovered part. The negative electrode includes, on a negative electrode foil having a band shape, a negative electrode active material covered part covered with a negative electrode active material layer, and a negative electrode active material uncovered part extending at least in a longitudinal direction of the negative electrode foil. The electrode wound body has a flat surface, in which portions of the negative electrode active material uncovered part are bent (Continued)

toward a central axis of the wound structure and overlap with each other in layers to form the flat surface. The flat surface and a bottom part of the battery can are coupled to each other. The secondary battery satisfies $0.05 \leq Z \leq 0.5$, Z being equal to $t \times m/T$, where t represents a thickness of the negative electrode foil in millimeters, m represents the number of the layers of the negative electrode active material uncovered part at a coupled portion farthest from the central axis, and T represents a thickness of the bottom part of the battery can in millimeters.

6 Claims, 14 Drawing Sheets

(56) References Cited

U.S. PATENT DOCUMENTS

2019/0229362 A1* 7/2019 Yoon ....................... H01M 4/66
2022/0328859 A1* 10/2022 Jeong ................ H01M 10/0431

OTHER PUBLICATIONS

Office Action issued for corresponding Chinese Patent Application No. 202280011451.8, dated May 29, 2026. (4 pages.).
Search Report issued for corresponding Chinese Patent Application No. 202280011451.8, dated May 26, 2026. (3 pages.).

* cited by examiner

A
B
21
21A
21B
21C 20
11
t×m
T
11B
a
11A
221A
LA
22
21
81
t
Z
X
Y

SECONDARY BATTERY, ELECTRONIC EQUIPMENT, AND ELECTRIC TOOL

CROSS REFERENCE TO RELATED APPLICATIONS

The present application is a continuation of PCT patent no. PCT/JP2022/001903, filed on Jan. 20, 2022, which claims priority to Japanese patent application no. 2021-012618, filed on Jan. 29, 2021, the entire contents of which are incorporated herein by reference.

BACKGROUND

The present application relates to a secondary battery, electronic equipment, and an electric tool.

Development of lithium ion batteries has expanded to applications that require high output power, including electric tools and vehicles. One of methods to achieve high output power is high-rate discharging in which a relatively large current is fed from a battery. Because the high-rate discharging involves feeding of a large current, it is desirable to reduce an internal resistance of the battery. For example, a cylindrical battery is described in which an exposed part of a negative electrode is directly coupled to a bottom of a battery can.

SUMMARY

The present application relates to a secondary battery, electronic equipment, and an electric tool.

A method is described of welding an exposed part of a negative electrode to a bottom of a battery can by irradiating the exposed part with laser light. However, there is a possibility that a welding defect can result. Thus, there is room for improvement in that a low-resistance battery is to be achieved.

The present application relates to providing, in an embodiment, a secondary battery, such as a lithium ion battery, that achieves a lower internal resistance of the battery, and to providing electronic equipment and an electric tool that each include the secondary battery.

The present application, in an embodiment, provides a secondary battery including an electrode wound body, a positive electrode current collector plate, and a battery can. The electrode wound body has a structure in which a positive electrode having a band shape and a negative electrode having a band shape are stacked with a separator interposed therebetween. The battery can contains the electrode wound body and the positive electrode current collector plate.

The positive electrode includes, on a positive electrode foil having a band shape, a positive electrode active material covered part covered with a positive electrode active material layer, and a positive electrode active material uncovered part.

The negative electrode includes, on a negative electrode foil having a band shape, a negative electrode active material covered part covered with a negative electrode active material layer, and a negative electrode active material uncovered part extending at least in a longitudinal direction of the negative electrode foil.

The electrode wound body has a flat surface, in which portions of the negative electrode active material uncovered part are bent toward a central axis of the wound structure and overlap with each other in layers to form the flat surface.

The flat surface and a bottom part of the battery can are coupled to each other.

The secondary battery satisfies $0.05 \leq Z \leq 0.5$, Z being equal to $t \times m/T$, where t represents a thickness of the negative electrode foil in millimeters, m represents the number of the layers of the negative electrode active material uncovered part at a coupled portion farthest from the central axis, and T represents a thickness of the bottom part of the battery can in millimeters.

In an embodiment, the present technology allows for reduction in internal resistance of the secondary battery. It should be understood that the contents of the present application are not to be construed as being limited by the effects exemplified herein.

DETAILED DESCRIPTION

One or more embodiments of the present application are described below in further detail including with reference to the drawings and examples.

It is to be noted that in order to facilitate understanding of description, some features or components in any of the drawings may be enlarged or reduced, or illustration of some portions may be simplified.

Figure 1:
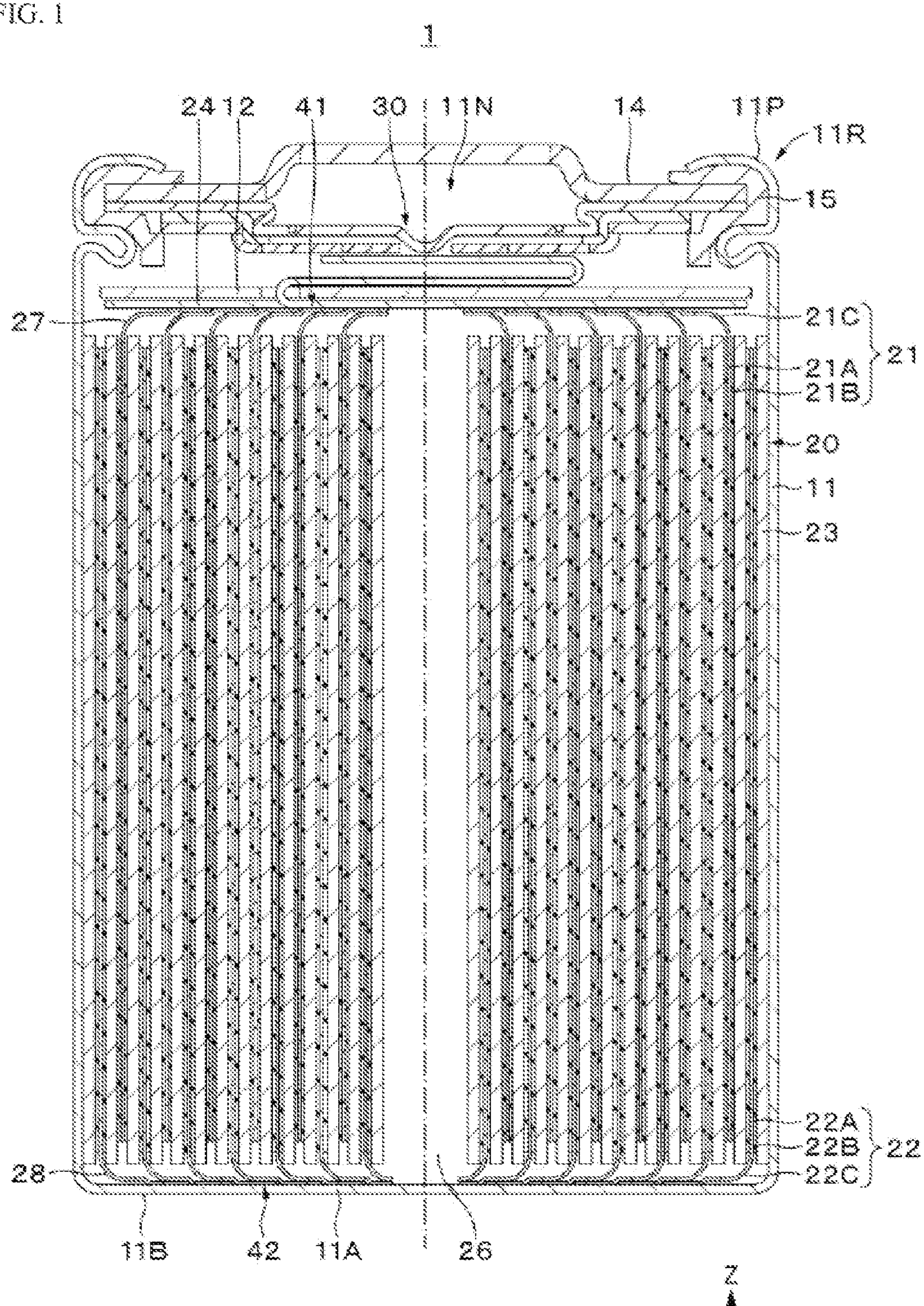
FIG. 1 is a sectional view of a lithium ion battery according to an embodiment.

In an embodiment, a lithium ion battery having a cylindrical shape will be described as an example of a secondary battery. An overall configuration of the lithium ion battery according to the present embodiment, i.e., a lithium ion battery 1, will be described with reference to FIGS. 1 to 7. FIG. 1 is a schematic sectional view of the lithium ion battery 1. As illustrated in FIG. 1, the lithium ion battery 1 has a cylindrical shape and includes an electrode wound body 20 contained inside a battery can 11, for example.

In a schematic configuration, the lithium ion battery 1 includes the battery can 11 having a cylindrical shape, and also includes, inside the battery can 11, an insulator 12 and the electrode wound body 20. Note that the lithium ion battery 1 may further include, for example, one or more of devices and members including, without limitation, a thermosensitive resistive device or a PTC device and a reinforcing member, inside the battery can 11.

The battery can 11 is a member that contains mainly the electrode wound body 20. The battery can 11 has a bottom part 11A, and further has an outer surface 11B as an outside-facing surface of the bottom part 11A. The battery can 11 is, for example, a cylindrical container with one end face open and another end face closed. That is, the battery can 11 has one open end face (an open end face 11N). The battery can 11 includes, for example, one or more of metal materials including, without limitation, iron, aluminum, and alloys thereof. The battery can 11 may have its surface plated with one or more of metal materials including, without limitation, nickel, for example.

The insulator 12 is a disk-shaped plate having a surface that is substantially perpendicular to a winding axis of the electrode wound body 20. The winding axis passes through substantially a center of each of end faces of the electrode wound body 20 and is in a direction parallel to a Z-axis in FIG. 1.

A battery cover 14 and a safety valve mechanism 30 are crimped to the open end face 11N of the battery can 11 via a gasket 15 to thereby provide a crimped structure 11R (a crimp structure). The battery can 11 is thus sealed, with the electrode wound body 20 and other components being contained inside the battery can 11. The battery cover 14 serves as an output terminal of a positive electrode of the lithium ion battery 1. The bottom part 11A of the battery can 11 serves as an output terminal of a negative electrode of the lithium ion battery 1. A region of the lithium ion battery 1 including the battery cover 14 will be referred to as a positive electrode side of the lithium ion battery 1. A region of the lithium ion battery 1 including the bottom part 11A of the battery can 11 will be referred to as a negative electrode side of the lithium ion battery 1.

The battery cover 14 is a member that closes the open end face 11N of the battery can 11 mainly in the state where the electrode wound body 20 and the other components are contained inside the battery can 11. The battery cover 14 includes, for example, a material similar to the material included in the battery can 11. A middle region of the battery cover 14 protrudes in a +Z direction, for example. A region other than the middle region, that is, a peripheral region, of the battery cover 14 is thus in contact with the safety valve mechanism 30, for example.

The gasket 15 is a member that is mainly interposed between the battery can 11 (a bent part 11P) and the battery cover 14 to thereby seal a gap between the bent part 11P and the battery cover 14. Note that the gasket 15 may have a surface coated with a material such as asphalt, for example.

The gasket 15 includes one or more of insulating materials, for example. The insulating material is not particularly limited in kind. For example, a polymer material such as polybutylene terephthalate (PBT) or polypropylene (PP) may be used as the insulating material. In particular, the insulating material is preferably polybutylene terephthalate.

A reason for this is that such a material is able to sufficiently seal the gap between the bent part 11P and the battery cover 14 while electrically separating the battery can 11 and the battery cover 14 from each other.

The safety valve mechanism 30 cancels the sealed state of the battery can 11 and thereby releases a pressure inside the battery can 11, i.e., an internal pressure of the battery can 11 on an as-needed basis, mainly upon an increase in the internal pressure. Examples of a cause of the increase in the internal pressure of the battery can 11 include a gas generated due to a decomposition reaction of an electrolytic solution during charging and discharging.

In the lithium ion battery 1 having a cylindrical shape, the positive electrode 21 having a band shape and the negative electrode 22 having a band shape, which are stacked with a separator 23 interposed therebetween and are wound in a spiral shape, are contained in the battery can 11, being impregnated with the electrolytic solution. The positive electrode 21 includes a positive electrode foil 21A with a positive electrode active material layer 21B provided on one of or each of both surfaces of the positive electrode foil 21A. A material of the positive electrode foil 21A is a metal foil including, for example, aluminum or an aluminum alloy. The negative electrode 22 includes a negative electrode foil 22A with a negative electrode active material layer 22B provided on one of or each of both surfaces of the negative electrode foil 22A. A material of the negative electrode foil 22A is a metal foil including, for example, nickel, a nickel alloy, copper, or a copper alloy. The separator 23 is a porous insulating film. The separator 23 electrically insulates the positive electrode 21 and the negative electrode 22 from each other, and allows for movement of substances including, without limitation, ions and the electrolytic solution.

Figure 2:
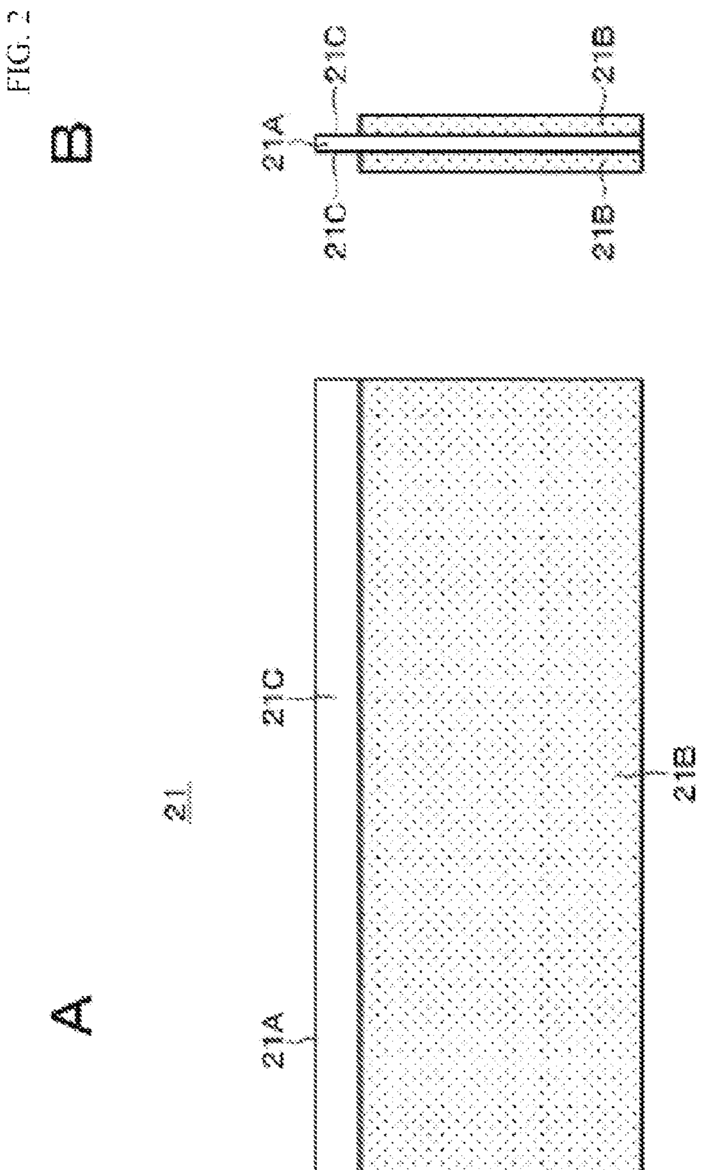
FIG. 2 includes views A and B which are diagrams for describing a positive electrode according to an embodiment.

FIG. 2, view A is a front view of the positive electrode 21 before being wound. FIG. 2, view B is a side view of the positive electrode 21 of FIG. 2, view A. The positive electrode 21 includes, at each of one major surface and another major surface of the positive electrode foil 21A, a part (a part shaded with dots) covered with the positive electrode active material layer 21B, and a positive electrode active material uncovered part 21C which is a part not covered with the positive electrode active material layer 21B. Note that in the following description, the part covered with the positive electrode active material layer 21B will be referred to as a positive electrode active material covered part 21B as appropriate. The positive electrode 21 may have a configuration in which the positive electrode active material covered part 21B is provided at one of the major surfaces of the positive electrode foil 21A.

Figure 3:
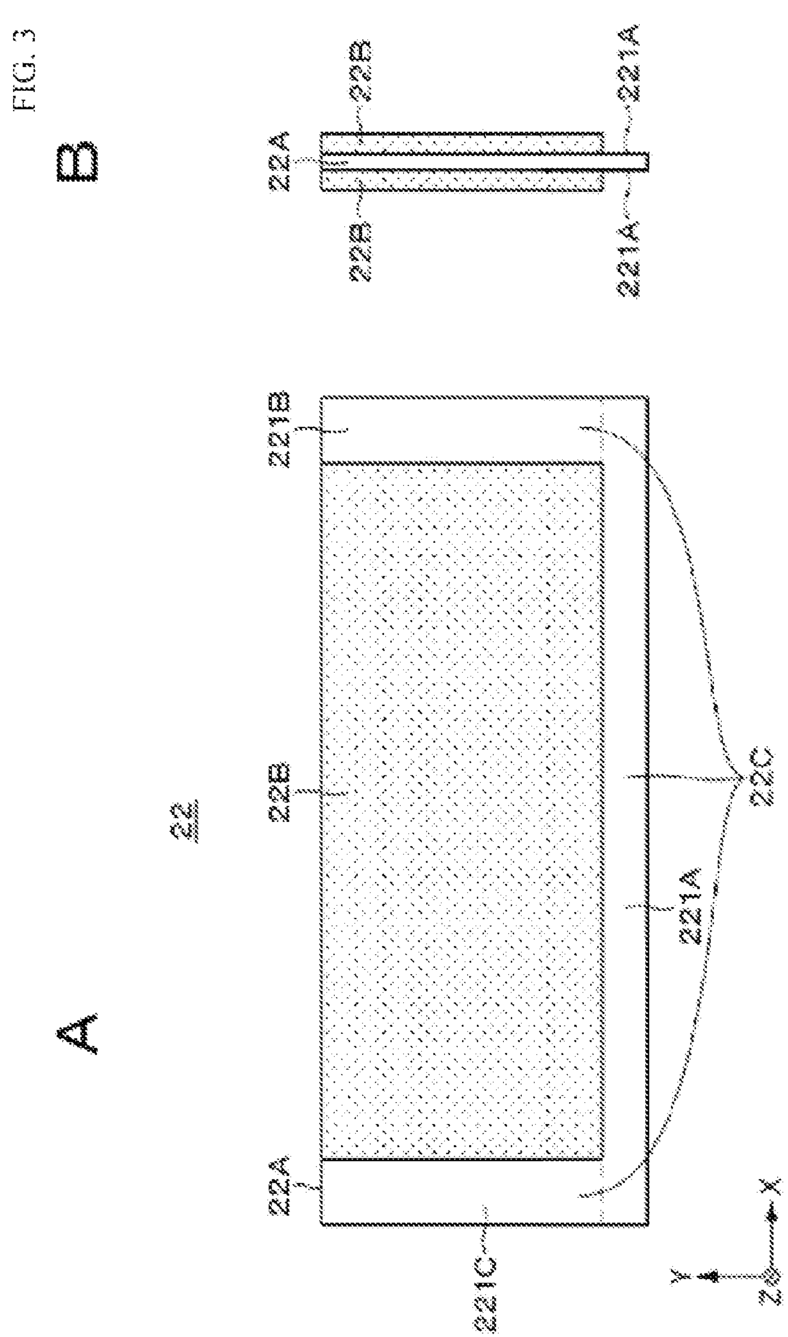
FIG. 3 includes views A and B which are diagrams for describing a negative electrode according to an embodiment.

FIG. 3, view A is a front view of the negative electrode 22 before being wound. FIG. 3, view B is a side view of the negative electrode 22 of FIG. 3, view A. The negative electrode 22 includes, at each of one major surface and another major surface of the negative electrode foil 22A, a part (a part shaded with dots) covered with the negative electrode active material layer 22B, and a negative electrode active material uncovered part 22C which is a part not covered with the negative electrode active material layer 22B. Note that in the following description, the part covered with the negative electrode active material layer 22B will be referred to as a negative electrode active material covered part 22B as appropriate. The negative electrode 22 may have a configuration in which the negative electrode active material covered part 22B is provided at one of the major surfaces of the negative electrode foil 22A.

As illustrated in FIG. 3, view A, the negative electrode active material uncovered part 22C includes, for example, a first negative electrode active material uncovered part 221A, a second negative electrode active material uncovered part 221B, and a third negative electrode active material uncovered part 221C. The first negative electrode active material uncovered part 221A extends in a longitudinal direction of the negative electrode 22, i.e., in an X-axis direction in FIG. 3. The second negative electrode active material uncovered part 221B is provided on a beginning side of winding of the negative electrode 22 and extends in a transverse direction of the negative electrode 22, i.e., in a Y-axis direction in FIG. 3, which will also be referred to as a width direction as appropriate. The third negative electrode active material uncovered part 221C is provided on an end side of the winding of the negative electrode 22 and extends in the transverse direction of the negative electrode 22, i.e., in the Y-axis direction in FIG. 3. Note that in FIG. 3, view A, a boundary between the first negative electrode active material uncovered part 221A and the second negative electrode active material uncovered part 221B, and a boundary between the first negative electrode active material uncovered part 221A and the third negative electrode active material uncovered part 221C are each represented by a dashed line.

In the electrode wound body 20 of the lithium ion battery 1 having the cylindrical shape according to the present embodiment, the positive electrode 21 and the negative electrode 22 are laid over each other and wound, with the separator 23 interposed therebetween, in such a manner that the positive electrode active material uncovered part 21C and the first negative electrode active material uncovered part 221A face toward opposite directions. The positive electrode active material uncovered part 21C is exposed at one of the end faces of the electrode wound body 20 having a substantially cylindrical shape. The first negative electrode active material uncovered part 221A is exposed at another of the end faces of the electrode wound body 20. A region of the electrode wound body 20 in which the positive electrode active material uncovered part 21C is exposed at the one of the end faces will be referred to as a positive electrode side of the electrode wound body 20. A region of the electrode wound body 20 in which the first negative electrode active material uncovered part 221A is exposed at the other of the end faces will be referred to as a negative electrode side of the electrode wound body 20.

The electrode wound body 20 has a through hole 26 at a center thereof. Specifically, the through hole 26 is a hole part that develops at substantially a center of a stack in which the positive electrode 21, the negative electrode 22, and the separator 23 are stacked. The through hole 26 is used as a hole into which a rod-shaped welding tool, which will hereinafter be referred to as a welding rod, as appropriate, is to be inserted in a process of assembling the lithium ion battery 1.

Figure 4:
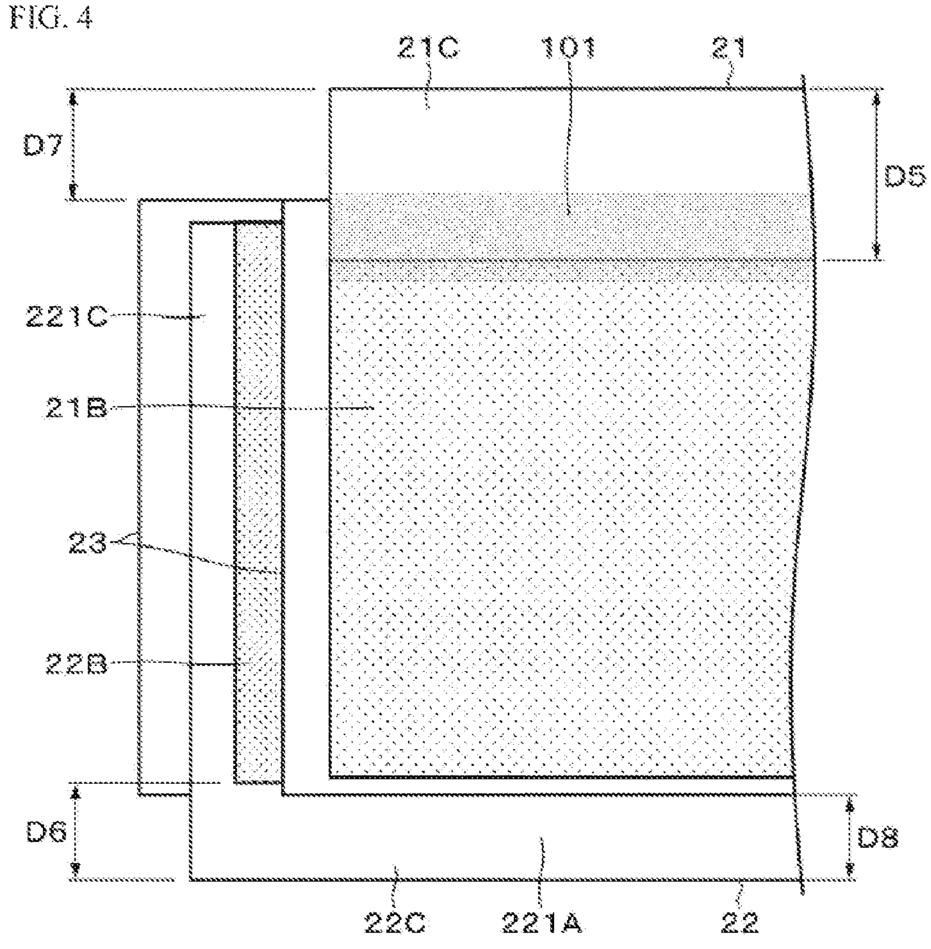
FIG. 4 is a diagram illustrating the positive electrode, the negative electrode, and a separator before being wound.

Details of the electrode wound body 20 will be described. FIG. 4 illustrates an example of a pre-winding structure in which the positive electrode 21, the negative electrode 22, and the separator 23 are stacked. The positive electrode 21 further includes an insulating layer 101 (a gray region part in FIG. 4) covering a boundary between the positive electrode active material covered part 21B (a part lightly shaded with dots in FIG. 4) and the positive electrode active material uncovered part 21C. The insulating layer 101 has a length in the width direction of about 3 mm, for example. All of a region of the positive electrode active material uncovered part 21C opposed to the negative electrode active material covered part 22B with the separator 23 interposed therebetween is covered with the insulating layer 101. The insulating layer 101 has an effect of reliably preventing an internal short circuit of the lithium ion battery 1 when foreign matter enters between the negative electrode active material covered part 22B and the positive electrode active material uncovered part 21C. In addition, the insulating layer 101 has an effect of, in a case where the lithium ion battery 1 undergoes an impact, absorbing the impact and thereby reliably preventing the positive electrode active material uncovered part 21C from bending and short-circuiting with the negative electrode 22.

Here, as illustrated in FIG. 4, a length of the positive electrode active material uncovered part 21C in the width direction is denoted as D5, and a length of the first negative electrode active material uncovered part 221A in the width direction is denoted as D6. In an embodiment, it is preferable that D5>D6. For example, D5=7 (mm), and D6=4 (mm). Where a length of a portion of the positive electrode active material uncovered part 21C protruding from one end in the width direction of the separator 23 is denoted as D7 and a length of a portion of the first negative electrode active material uncovered part 221A protruding from another end in the width direction of the separator 23 is denoted as D8, in an embodiment, it is preferable that D7>D8. For example, D7=4.5 (mm), and D8=3 (mm).

The positive electrode foil 21A and the positive electrode active material uncovered part 21C include aluminum, for example. The negative electrode foil 22A and the negative electrode active material uncovered part 22C include copper, for example. Thus, the positive electrode active material uncovered part 21C is typically softer, that is, lower in Young's modulus, than the negative electrode active material uncovered part 22C. Accordingly, in an embodiment, it is more preferable that D5>D6 and D7>D8. In such a case, when portions of the positive electrode active material uncovered part 21C and portions of the negative electrode active material uncovered part 22C (in this example, portions of the first negative electrode active material uncovered part 221A) are simultaneously bent with equal pressures from both electrode sides, respective heights of the bent portions as measured from respective ends of the separator 23 may be substantially the same between the positive electrode 21 and the negative electrode 22. In this situation, the portions of the positive electrode active material uncovered part 21C appropriately overlap with each other when bent, which makes it possible to easily couple the positive electrode active material uncovered part 21C and a positive electrode current collector plate 24 to each other by laser welding in a process of fabricating the lithium ion battery 1. Further, the portions of the first negative electrode active material uncovered part 221A appropriately overlap with each other when bent, which makes it possible to easily couple the first negative electrode active material uncovered part 221A and the bottom part 11A of the battery can 11 to each other by laser welding in the process of fabricating the lithium ion battery 1. Details of the process of fabricating the lithium ion battery 1 will be described later.

In a typical lithium ion battery, for example, a lead for current extraction is welded at one location on each of the positive electrode and the negative electrode. However, such a configuration is not suitable for high-rate discharging because a high internal resistance of the battery results to cause the lithium ion battery to generate heat and become hot during discharging. To address this, in the lithium ion battery 1 according to the present embodiment, the positive electrode current collector plate 24 is disposed on one of the end faces, i.e., an end face 41, of the electrode wound body 20. In addition, the positive electrode current collector plate 24 and the positive electrode active material uncovered part 21C located at the end face 41 are welded to each other at multiple points. The internal resistance of the lithium ion battery 1 is thereby kept low to allow for high-rate discharging.

Figure 5:
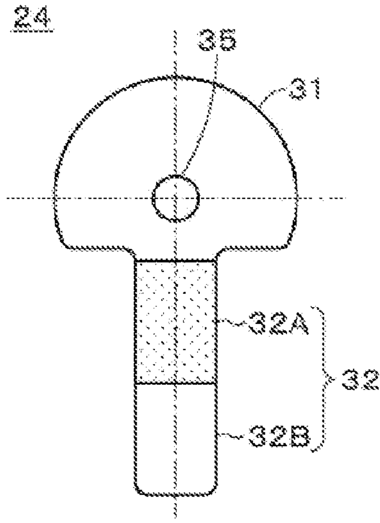
FIG. 5 is a plan view of a positive electrode current collector plate according to an embodiment.

FIG. 5 is a diagram illustrating the positive electrode current collector plate 24 according to the present embodiment. The positive electrode current collector plate 24 is contained in the battery can 11 (see FIG. 1). A material of the positive electrode current collector plate 24 is a metal plate including, for example, a simple substance or a composite material of aluminum or an aluminum alloy. As illustrated in FIG. 5, the positive electrode current collector plate 24 has a shape in which a band-shaped part 32 having a rectangular shape is attached to a fan-shaped part 31 having a flat fan shape. The fan-shaped part 31 has a hole 35 at a position near a middle thereof. The position of the hole 35 corresponds to a position of the through hole 26.

A part shaded with dots in FIG. 5 represents an insulating part 32A in which an insulating tape or an insulating material is attached or applied to the band-shaped part 32. A part below the dot-shaded part in FIG. 5 represents a coupling part 32B to be coupled to a sealing plate that also serves as an external terminal. Note that in a case of a battery structure having no metallic center pin (not illustrated) in the through hole 26, the insulating part 32A may be omitted because there is a low possibility of contact of the band-shaped part 32 with a region of a negative electrode potential. In such a case, it is possible to increase charge and discharge capacities by increasing a width of each of the positive electrode 21 and the negative electrode 22 by an amount corresponding to a thickness of the insulating part 32A.

The fan-shaped part 31 of the positive electrode current collector plate 24, which is in the shape of a fan, covers a portion of the end face 41. By not covering all of the end face 41, it is possible to allow the electrolytic solution to smoothly permeate the electrode wound body 20 in assembling the lithium ion battery 1, and it is also possible to facilitate releasing of a gas, which is generated when the lithium ion battery 1 comes into an abnormally hot state or an overcharged state, to the outside of the lithium ion battery 1.

The positive electrode active material layer 21B includes at least a positive electrode material (a positive electrode active material) into which lithium is insertable and from which lithium is extractable, and may further include, for example, a positive electrode binder and a positive electrode conductor. The positive electrode material is preferably a lithium-containing composite oxide or a lithium-containing phosphoric acid compound. The lithium-containing composite oxide has a layered rock-salt crystal structure or a spinel crystal structure, for example. The lithium-containing phosphoric acid compound has an olivine crystal structure, for example.

The positive electrode binder includes a synthetic rubber or a polymer compound. Examples of the synthetic rubber include a styrene-butadiene-based rubber, a fluorine-based rubber, and ethylene propylene diene. Examples of the polymer compound include polyvinylidene difluoride (PVdF) and polyimide.

The positive electrode conductor is a carbon material such as graphite, carbon black, acetylene black, or Ketjen black. Note that the positive electrode conductor may be a metal material or an electrically conductive polymer.

The negative electrode foil 22A configuring the negative electrode 22 is preferably roughened at its surface to achieve improved adherence to the negative electrode active material layer 22B. The negative electrode active material layer 22B includes at least a negative electrode material (a negative electrode active material) into which lithium is insertable and from which lithium is extractable, and may further include, for example, a negative electrode binder and a negative electrode conductor.

The negative electrode material includes a carbon material, for example. The carbon material is graphitizable carbon, non-graphitizable carbon, graphite, low-crystalline carbon, or amorphous carbon. The carbon material has a fibrous shape, a spherical shape, a granular shape, or a flaky shape.

Further, the negative electrode material includes a metal-based material, for example. Examples of the metal-based material include Li (lithium), Si (silicon), Sn (tin), Al (aluminum), Zr (zinc), and Ti (titanium). A metallic element forms a compound, a mixture, or an alloy with another element, and examples thereof include silicon oxide ($SiO_x$ ($0<x\leq 2$)), silicon carbide (SiC), an alloy of carbon and silicon, and lithium titanium oxide (LTO).

The separator 23 is a porous film including a resin, and may be a stacked film including two or more kinds of porous films. Examples of the resin include polypropylene and polyethylene. With the porous film as a base layer, the separator 23 may include a resin layer provided on one of or each of both surfaces of the base layer. A reason for this is that this improves adherence of the separator 23 to each of the positive electrode 21 and the negative electrode 22 and thus suppresses distortion of the electrode wound body 20.

The resin layer includes a resin such as PVdF. In a case of forming the resin layer, a solution including an organic solvent and the resin dissolved therein is applied on the base layer, following which the base layer is dried. Note that the base layer may be immersed in the solution and thereafter the base layer may be dried. From the viewpoint of improving heat resistance and battery safety, the resin layer preferably includes inorganic particles or organic particles. Examples of the kind of the inorganic particles include aluminum oxide, aluminum nitride, aluminum hydroxide, magnesium hydroxide, boehmite, talc, silica, and mica. Alternatively, a surface layer including inorganic particles as a main component and formed by a method such as a sputtering method or an atomic layer deposition (ALD) method may be used instead of the resin layer.

The electrolytic solution includes a solvent and an electrolyte salt, and may further include other materials such as additives on an as-needed basis. The solvent is a nonaqueous solvent such as an organic solvent, or water. The electrolytic solution including a nonaqueous solvent is called a nonaqueous electrolytic solution. Examples of the nonaqueous solvent include a cyclic carbonic acid ester, a chain carbonic acid ester, a lactone, a chain carboxylic acid ester, and a nitrile (mononitrile).

Although a typical example of the electrolyte salt is a lithium salt, the electrolyte salt may include any salt other than the lithium salt. Examples of the lithium salt include lithium hexafluorophosphate ($LiPF_6$), lithium tetrafluoroborate ($LiBF_4$), lithium perchlorate ($LiClO_4$), lithium methanesulfonate ($LiCH_3SO_3$), lithium trifluoromethanesulfonate ($LiCF_3SO_3$), and dilithium hexafluorosilicate ($Li_2SF_6$). These salts may also be used in mixture with each other. From the viewpoint of improving a battery characteristic, it is preferable to use a mixture of $LiPF_6$ and $LiBF_4$, in particular. Although not particularly limited, a content of the electrolyte salt is preferably in a range from 0.3 mol/kg to 3 mol/kg both inclusive with respect to the solvent.

Figure 6:
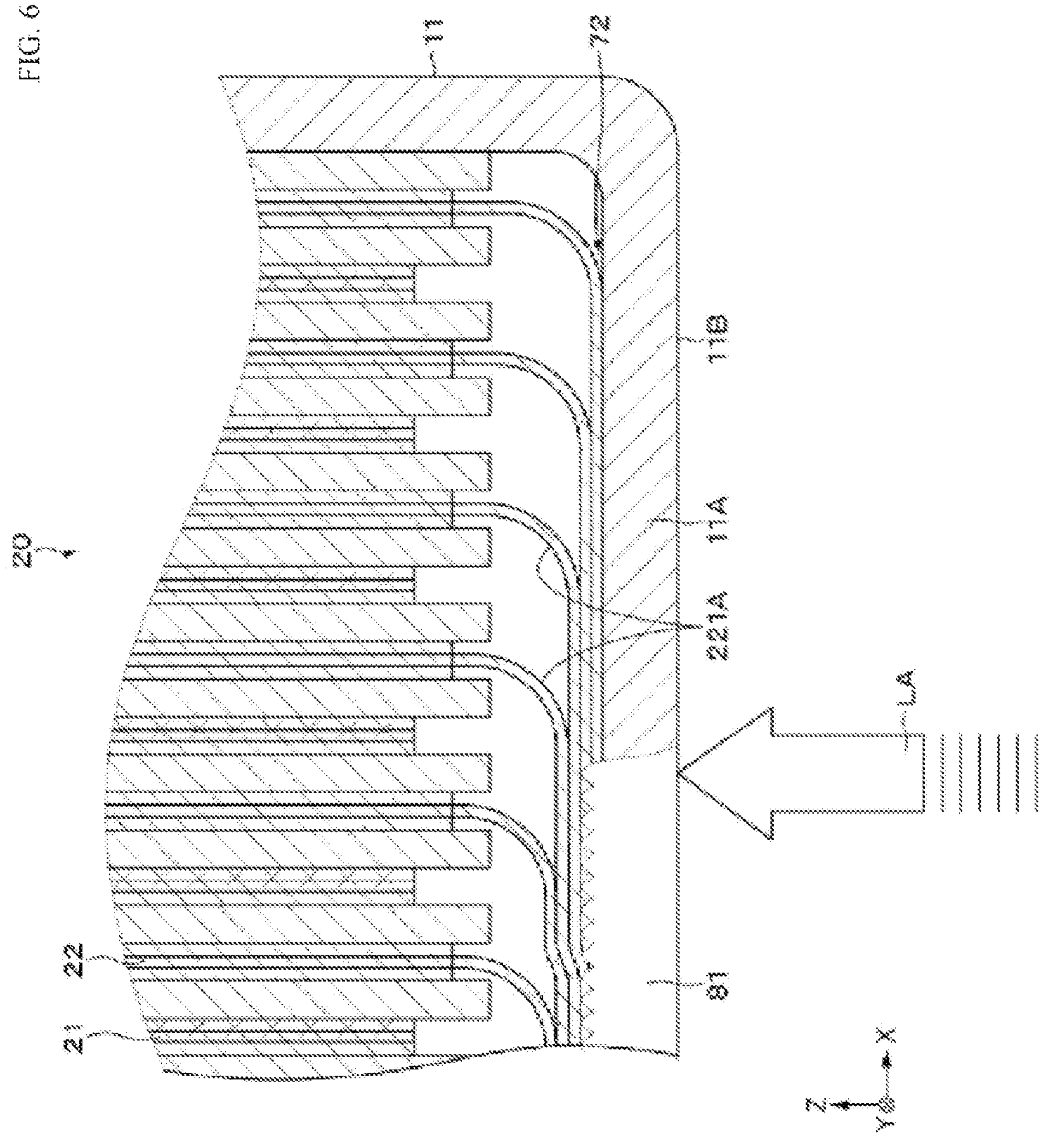
FIG. 6 is a partial enlarged sectional view of a negative electrode side of the lithium ion battery according to an embodiment.
Figure 7:
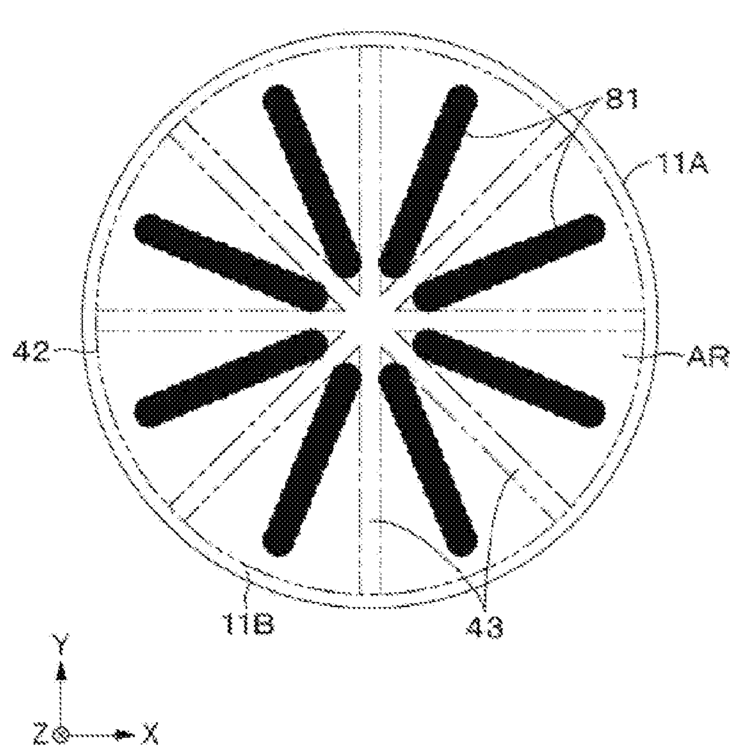
FIG. 7 is a diagram for describing an example of a welded portion.

Now, with reference to FIGS. 6 and 7, a description will be given of a portion, of the first negative electrode active material uncovered part 221A, that is welded. FIG. 6 is a partial enlarged sectional view of the lithium ion battery 1 according to the present embodiment, i.e., an enlarged sectional view of the vicinity of the lower right in FIG. 1. FIG. 7 illustrates the bottom part 11A of the lithium ion battery 1 as viewed in the +Z direction.

As illustrated in FIG. 6, the electrode wound body 20 has a flat surface 72, in which portions of the first negative electrode active material uncovered part 221A are bent toward a central axis of a wound structure and overlap with each other to form the flat surface 72. The flat surface 72 is a surface formed by the portions of the first negative electrode active material uncovered part 221A stacked in at least two or more layers.

Irradiating the outer surface 11B of the battery can 11 with laser light LA forms a weld 81. The flat surface 72 is coupled to the bottom part 11A of the battery can 11 by the weld 81.

Figure 8:
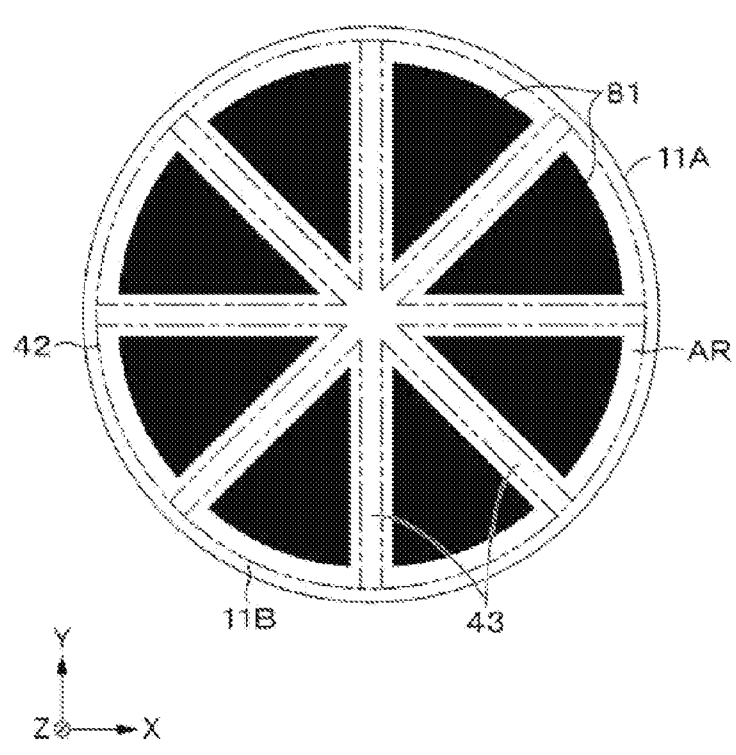
FIG. 8 is a diagram for describing another example of the welded portion.
Figure 9:
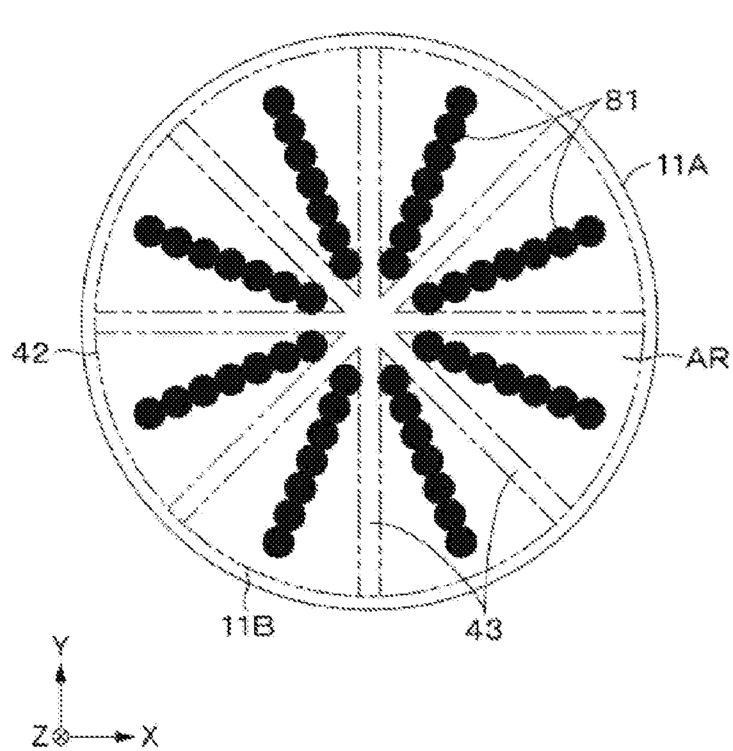
FIG. 9 is a diagram for describing another example of the welded portion.

Laser welding is performed by continuous irradiation while changing irradiation positions with output power of the laser light kept constant. For example, as illustrated in FIG. 7, the weld 81 is formed by continuously irradiating the bottom part 11A with the laser light in an outward direction from a point in the vicinity of a center of the bottom part 11A. In the present embodiment, eight welds 81 are formed radially; however, the number of the welds 81 may be changed as appropriate. Further, as illustrated in FIG. 8, the welds 81 may be formed by welding certain regions, such as fan-shaped regions filled in with black. Alternatively, as illustrated in FIG. 9, the welds 81 may be formed by intermittent irradiation with the laser light.

As used herein, the term "flat surface" encompasses not only a completely flat surface but also a surface having some asperities or surface roughness to the extent that it is possible to couple the positive electrode active material uncovered part 21C and the positive electrode current collector plate 24 to each other and to couple the first negative electrode active material uncovered part 221A and the bottom part 11A of the battery can 11 to each other.

Next, a method of fabricating the lithium ion battery 1 according to an embodiment will be described with reference to FIG. 10, views A to F. First, the positive electrode active material was applied on the surface of the positive electrode foil 21A having a band shape to thereby form the positive electrode active material covered part 21B, and the negative electrode active material was applied on the surface of the negative electrode foil 22A having a band shape to thereby form the negative electrode active material covered part 22B. At this time, the positive electrode active material uncovered part 21C without the positive electrode active material applied thereon was provided on one end side in the width direction of the positive electrode foil 21A, and the negative electrode foil 22A was provided with the negative electrode active material uncovered part 22C (including the first negative electrode active material uncovered part 221A, the second negative electrode active material uncovered part 221B, and the third negative electrode active material uncovered part 221C) without the negative electrode active material applied thereon. Thereafter, the positive electrode 21 and the negative electrode 22 were subjected to processes including a drying process. Thereafter, the positive electrode 21 and the negative electrode 22 were laid over each other with the separator 23 interposed therebetween in such a manner that the positive electrode active material uncovered part 21C and the negative electrode active material uncovered part 22C faced toward opposite directions, and they were wound in a spiral shape to allow the through hole 26 to develop on the central axis. Thus, the electrode wound body 20 as illustrated in FIG. 10, view A was fabricated.

Figure 10:
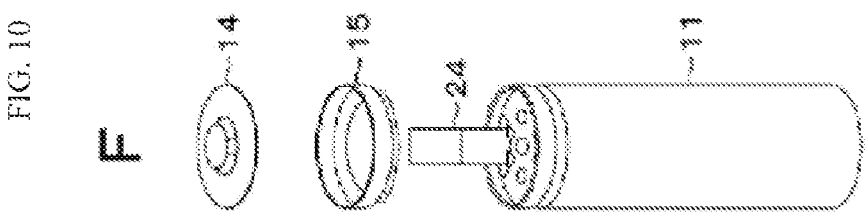
FIG. 10 includes views A to F which are diagrams describing a process of assembling the lithium ion battery according to an embodiment.
Figure 10:
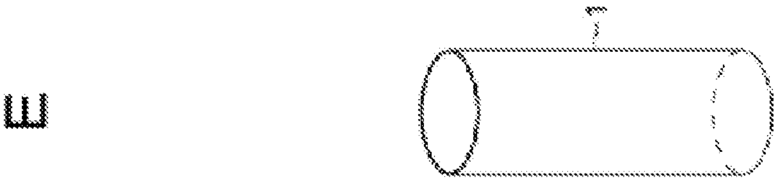
Figure 10:
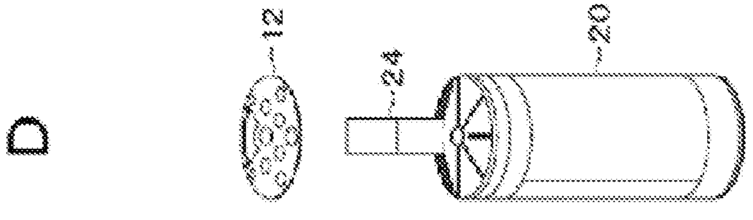
Figure 10:
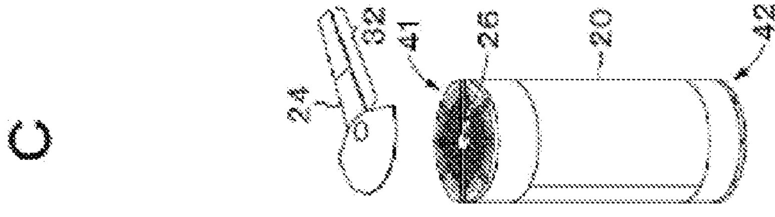
Figure 10:
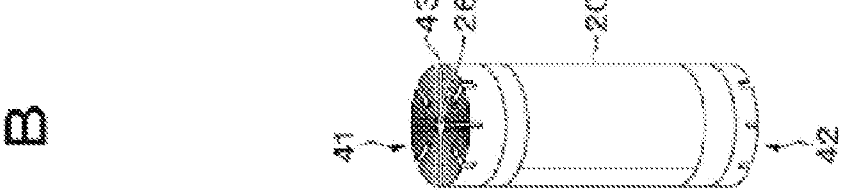
Figure 10:
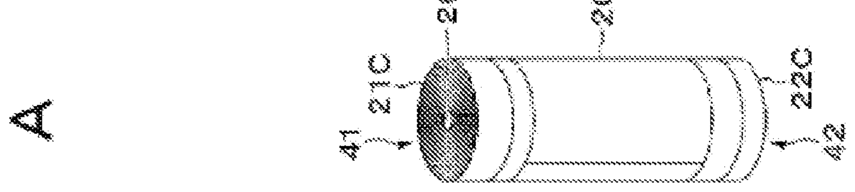

Thereafter, grooves 43 were formed, as illustrated in FIG. 10, view B, in a portion of the end face 41, i.e., the end face on the positive electrode side, and a portion of an end face 42, i.e., the end face on the negative electrode side, by pressing an edge of a thin flat plate or the like (having a thickness of 0.5 mm, for example) perpendicularly against each of the end faces 41 and 42. By this method, the grooves 43 were formed to extend radially from the through hole 26. For example, the grooves 43 extend from an outer edge part 27 of the end face 41 to the through hole 26, or from an outer edge part 28 of the end face 42 to the through hole 26. For example, as illustrated in FIG. 7, eight grooves 43 may be formed radially at substantially regular intervals in the end face 42. Note that the number and arrangement of the grooves 43 may be changed as appropriate.

Thereafter, as illustrated in FIG. 10, view C, the end faces 41 and 42 were made into flat surfaces by applying equal pressures to the end faces 41 and 42 simultaneously from both electrode sides in directions substantially perpendicular to the end faces 41 and 42 and thereby bending the positive electrode active material uncovered part 21C and the negative electrode active material uncovered part 22C (in this example, the first negative electrode active material uncovered part 221A) toward the central axis of the wound structure. At this time, a load was applied using, for example, a plate surface of a flat plate or the like to cause portions of the positive electrode active material uncovered part 21C that are located at the end face 41 to be bent toward the central axis and overlap with each other and to cause portions of the first negative electrode active material uncovered part 221A that are located at the end face 42 to be bent toward the central axis and overlap with each other. Thereafter, the fan-shaped part 31 of the positive electrode current collector plate 24 was coupled to the end face 41 by laser welding.

Thereafter, as illustrated in FIG. 10, view D, the band-shaped part 32 of the positive electrode current collector plate 24 was bent, the insulator 12 was attached to the positive electrode current collector plate 24, and the electrode wound body 20 having been assembled in the above-described manner was placed into the battery can 11 illustrated in FIG. 10, view E. Thereafter, the outer surface 11B of the bottom part 11A of the battery can 11 was irradiated with laser light to thereby couple the flat surface 72 to the bottom part 11A. The electrolytic solution was injected into the battery can 11, following which the battery can 11 was sealed with the gasket 15 and the battery cover 14, as illustrated in FIG. 10, view F. The lithium ion battery 1 was fabricated as described above.

Note that the insulator 12 may be an insulating tape. Further, a method of coupling may be other than laser welding. The grooves 43 remain in the flat surface even after the positive electrode active material uncovered part 21C is bent, and a portion of the flat surface without the grooves 43 is coupled to the positive electrode current collector plate 24; however, the grooves 43 may be coupled to a portion of the positive electrode current collector plate 24.

In the present embodiment, the first negative electrode active material uncovered part 221A is directly coupled to the bottom part 11A of the battery can 11. This makes it possible for the lithium ion battery 1 to achieve lower resistance. Further, bending the first negative electrode active material uncovered part 221A toward the central axis allows for formation of the flat surface 72 in which portions of the first negative electrode active material uncovered part 221A overlap with each other in layers. Accordingly, a thickness of an irradiation site is securable when the outer surface 11B of the bottom part 11A is irradiated with laser light. This helps to prevent the electrode wound body 20 from being damaged by the laser light penetrating the bottom part 11A, and to prevent the bottom part 11A from being perforated with a hole to result in leakage of the electrolytic solution therethrough.

Moreover, in the present embodiment, the grooves 43 are formed in a portion of each of the end faces 41 and 42 of the electrode wound body 20. The grooves 43 allow the portions of the first negative electrode active material uncovered part 221A to be bent with regularity, which makes it possible to form the flat surface 72 in which the portions of the first negative electrode active material uncovered part 221A overlap with each other in two or more layers.

According to the present embodiment, in the electrode wound body 20, the positive electrode 21 and the negative electrode 22 are laid over each other and wound in such a manner that the positive electrode active material uncovered part 21C and the negative electrode active material uncovered part 22C face toward opposite directions. Thus, the positive electrode active material uncovered part 21C is localized to the end face 41, and the negative electrode active material uncovered part 22C is localized to the end face 42 of the electrode wound body 20. The positive electrode active material uncovered part 21C and the first negative electrode active material uncovered part 221A are bent to make the end faces 41 and 42 into flat surfaces. The direction of bending is from the outer edge part 27 of the end face 41 toward the central axis, or from the outer edge part 28 of the end face 42 toward the central axis. Portions of the active material uncovered part that are located in adjacent winds in a wound state are bent and overlap with each other. By making the end face 41 into a flat surface, it is possible to achieve better contact between the positive electrode active material uncovered part 21C and the positive electrode current collector plate 24, and to achieve better contact between the first negative electrode active material uncovered part 221A and the bottom part 11A of the battery can 11. Further, the configuration in which the end faces 41 and 42 are flat surfaces makes it possible for the lithium ion battery 1 to achieve reduced resistance.

It may seem to be possible to make the end faces 41 and 42 into flat surfaces by bending the positive electrode active material uncovered part 21C and the first negative electrode active material uncovered part 221A; however, without any processing in advance of bending, creases or voids (gaps or spaces) can develop in the end faces 41 and 42 upon bending, thus making it difficult for the end faces 41 and 42 to be flat surfaces. Here, "creases" and "voids" are unevenness that can develop in the positive electrode active material uncovered part 21C and the first negative electrode active material uncovered part 221A having been bent, resulting in non-flat portions of the end faces 41 and 42. In the present embodiment, the grooves 43 are formed in advance in radial directions from the through hole 26 on each of the end face 41 side and the end face 42 side. The presence of the grooves 43 helps to prevent the creases and voids from developing, and thereby helps to achieve increased flatness of the end faces 41 and 42. Note that although only the first negative electrode active material uncovered part 221A may be bent, it is preferable that both the positive electrode active material uncovered part 21C and the first negative electrode active material uncovered part 221A be bent.

During fabrication of the lithium ion battery 1, the negative electrode active material can sometimes peel off the negative electrode active material covered part 22B on the beginning side of winding of the electrode wound body 20, i.e., an end side in the longitudinal direction of the positive electrode or the negative electrode located in an innermost wind of the electrode wound body 20, when the edge of a thin flat plate or the like (having a thickness of 0.5 mm, for example) is pressed perpendicularly against each of the end faces 41 and 42, that is, when the process illustrated in FIG. 10B is performed. A possible cause of the peeling is stress generated upon pressing the thin flat plate or the like against the end face 42. The negative electrode active material having peeled off can enter the inside of the electrode wound body 20 and can thereby cause an internal short circuit. According to the present embodiment, the provision of the second negative electrode active material uncovered part 221B and the third negative electrode active material uncovered part 221C helps to prevent the peeling of the negative electrode active material, thereby helping to prevent the occurrence of the internal short circuit. Such an effect is achievable even with a configuration in which only either the second negative electrode active material uncovered part 221B or the third negative electrode active material uncovered part 221C is provided; however, it is preferable that both be provided.

On the end side of the winding of the electrode wound body 20, the negative electrode 22 may have a region of the negative electrode active material uncovered part 22C at a major surface facing away from the positive electrode active material covered part 21B. A reason for this is that even if the negative electrode active material covered part 22B is present at the major surface facing away from the positive electrode active material covered part 21B, its contribution to charging and discharging is considered to be low. The region of the negative electrode active material uncovered part 22C preferably falls within a range from ¾ winds to 5/4 winds, both inclusive, of the electrode wound body 20. In this case, owing to the absence of the negative electrode active material covered part 22B that is low in contribution to charging and discharging, it is possible to make an initial capacity higher with respect to the same volume of the electrode wound body 20.

EXAMPLES

In the following, the present application will be described, in an embodiment, with reference to Examples in which the lithium ion batteries 1 fabricated in the above-described manner were used to compare internal resistances therebetween for any differences. Note that the present application is not limited to Examples described below.

For each of all Examples and comparative examples described below, a battery size was set to 21700 (21 mm in diameter and 70 mm in height), a length of the positive electrode active material covered part 21B in the width direction was set to 59 (mm), a length of the negative electrode active material covered part 22B in the width direction was set to 62 (mm), and a length of the separator 23 in the width direction was set to 64 (mm). The separator 23 was placed to cover all of regions of the positive electrode active material covered part 21B and the negative electrode active material covered part 22B. A distance from an end of the positive electrode active material covered part 21B to an end of the separator 23 was set to 1.0 (mm), and a distance from an end of the negative electrode active material covered part 22B to an end of the separator 23 was set to 2.5 (mm). The number of the grooves 43 was set to eight, and the eight grooves were arranged at substantially equal angular intervals. A spacing between adjacent portions of the positive electrode active material uncovered part 21C or a spacing between adjacent portions of the negative electrode active material uncovered part 22C in the wound structure was set to about 0.2 mm.

Figure 11:
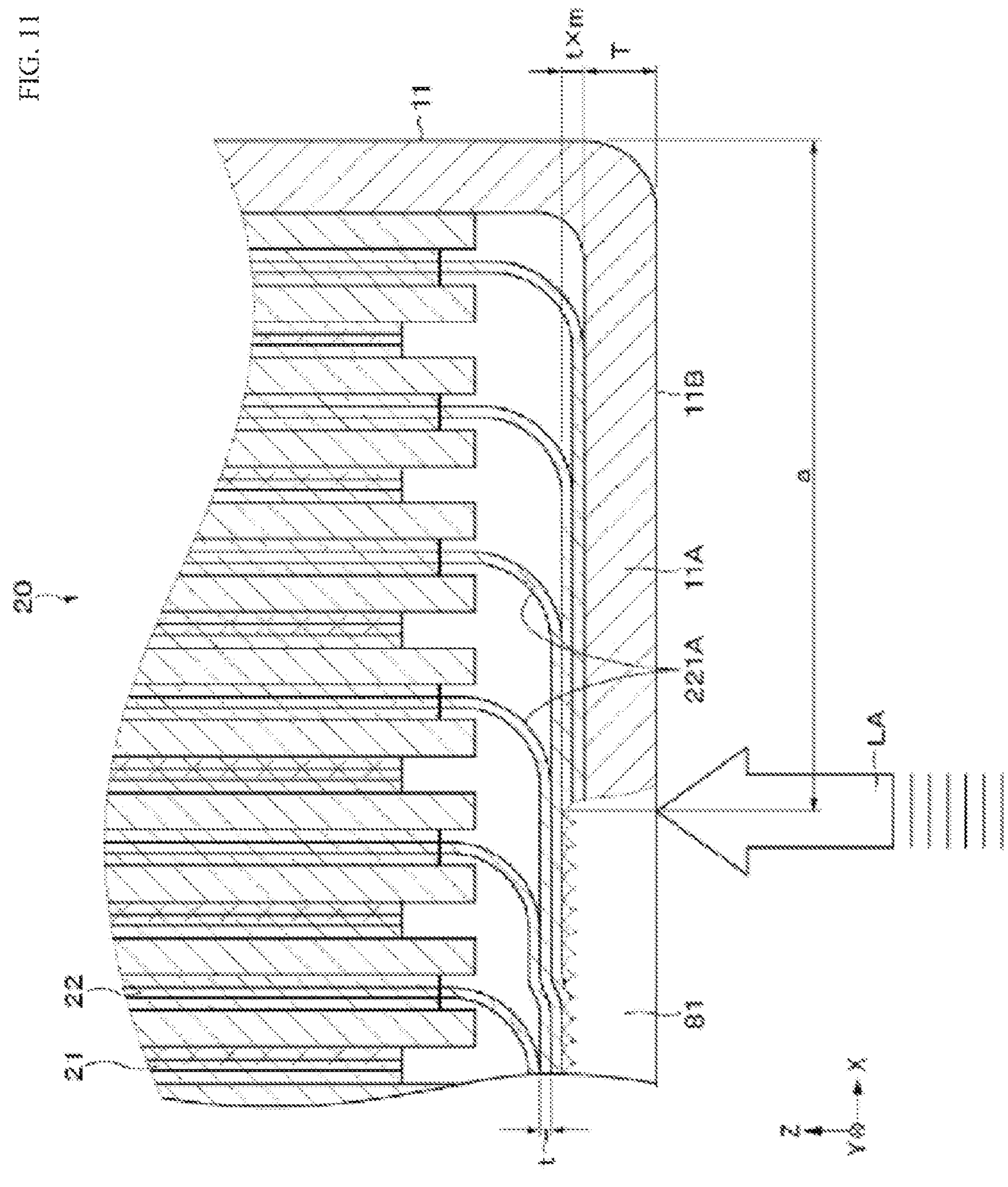
FIG. 11 is a diagram for describing parameters in Examples and comparative examples.

FIG. 11 illustrates a section of a portion in the vicinity of the weld 81 between the first negative electrode active material uncovered part 221A and the bottom part 11A of the battery can 11. Welding was performed by irradiating a region from the vicinity of the central axis to a point at a distance "a" from a side surface of the electrode wound body 20 with the laser light LA at a predetermined output power. The number m of layers of the first negative electrode active material uncovered part 221A is the number of welded layers of the first negative electrode active material uncovered part 221A directly below the point at the distance "a" in FIG. 11. The point at the distance "a" is a point farthest from the central axis, out of a track formed by the laser light LA. It is possible to recognize the number of the layers by, for example, cutting the lithium ion battery 1 along a plane parallel to the central axis and observing the vicinity of the weld 81, that is, by sectional observation, with a device such as a microscope.

Examples 1 to 3

For Examples 1 to 3, as illustrated in FIG. 11, a thickness of the negative electrode foil 22A, that is, a thickness (e.g., an average thickness) per sheet of the negative electrode foil 22A, at a coupled portion farthest from the central axis was denoted as t (mm), and the number of the layers of the first negative electrode active material uncovered part 221A was denoted as m. Further, a thickness of the bottom part 11A of the battery can 11 was denoted as T (mm). The thickness of the bottom part 11A of the battery can 11 may also be said to be a thickness of a base material of the battery can 11. In Examples 1 to 3, Z was set to the following range: $0.05 \leq Z \leq 0.5$, where $Z = t \times m/T$, that is, where Z is a ratio of a thickness of the layers of the first negative electrode active material uncovered part 221A at the point at the distance "a", to the thickness of the bottom part 11A of the battery can 11.

Comparative Examples 1 to 3

The same symbols t, m, T, and Z were used to denote the same parameters as those in Examples. In Comparative example 1, Z was set to be less than 0.05, more specifically, to 0.040. In Comparative example 2, Z was set to be greater than 0.5, more specifically, to 0.540. In Comparative example 3, m was set to 1. Specific values of t, m, T, and Z in Examples and the comparative examples are listed in Table 1.

The lithium ion batteries 1 described above were evaluated. The number of test batteries was set to 30 for each of Examples and the comparative examples. The number of the test batteries in which any welding defect such as perforation or spatter was found by visual observation after laser welding was determined as the number of occurrences of welding defects. Internal resistances (direct-current resistances) were measured for all the batteries completed, and the batteries with a calculated average value of 11.0 (mΩ) or less were judged as PASS, whereas the other batteries were judged as FAIL. The direct-current resistance is obtainable by calculating a gradient of voltage when a discharge current is increased from 0 (A) to 100 (A) in five seconds. The results are given in Table 1 below.

TABLE 1

| | Thickness t [mm] of negative electrode foil | Number m of layers of first negative electrode active material uncovered part | Thickness T [mm] of bottom part of battery can | $Z = t \times m/T$ | Number of occurrences of welding defects out of 30 test batteries | Internal resistance DCR (mΩ) of completed battery |
|---|---|---|---|---|---|---|
| Example 1 | 0.008 | 2 | 0.3 | 0.053 | 0 | 9.81 (PASS) |
| Example 2 | 0.012 | 12 | 0.3 | 0.480 | 0 | 9.78 (PASS) |
| Example 3 | 0.008 | 10 | 0.4 | 0.200 | 0 | 9.90 (PASS) |
| Comparative example 1 | 0.008 | 2 | 0.4 | 0.040 | 7 | 12.64 (FAIL) |
| Comparative example 2 | 0.012 | 9 | 0.2 | 0.540 | 17 | 15.12 (FAIL) |
| Comparative example 3 | 0.012 | 1 | 0.3 | 0.040 | 10 | 12.87 (FAIL) |

In Examples 1 to 3, the internal resistances of the batteries were 11.0 (mΩ) or less and no welding defects occurred. In contrast, in Comparative examples 1 to 3, the cell resistances were greater than 11.0 (mΩ) and welding defects occurred. Specifically, in Comparative example 1, due to Z being less than a lower limit, the bottom part 11A was perforated to result in the welding defects. In Comparative example 2, the welding defects occurred due to the number of the layers of the first negative electrode active material uncovered part 221A being too small with respect to the thickness of the bottom part 11A. In Comparative example 3, due to the number of the layers being one, the bottom part 11A was perforated by heat of the laser light LA, which resulted in the welding defects. As indicated in Table 1, lower internal resistances of the lithium ion batteries 1 were achieved when $0.05 \leq Z \leq 0.5$, as in Examples 1 to 3.

Although one or more embodiments of the present application have been described above, the contents of the present application are not limited thereto, and various modifications may be made.

The present technology is also applicable to a battery of a tabless structure in which the positive electrode active material uncovered part 21C is not bent. Although a configuration having the second negative electrode active material uncovered part 221B and the third negative electrode active material uncovered part 221C is preferable, the present technology is also applicable to a lithium ion battery including neither of the second and third negative electrode active material uncovered parts 221B and 221C.

Although the number of the grooves 43 is eight in Examples and the comparative examples, any other number may be chosen. Although the battery size chosen is 21700 (21 mm in diameter and 70 mm in height), the battery size may be 18650 (18 mm in diameter and 65 mm in height) or any other size.

The fan-shaped part 31 may have a shape other than the fan shape.

The present technology is applicable to any suitable battery including the lithium ion battery, and to any battery having a cylindrical shape or any other suitable shape, such as a laminated battery, a prismatic battery, a coin-type battery, or a button-type battery, without departing from the scope of the present technology. In such a case, the shape of the "end face of the electrode wound body" is not limited to a circular shape, and may be any of other suitable shapes including, without limitation, an elliptical shape and an elongated shape.

Figure 12:
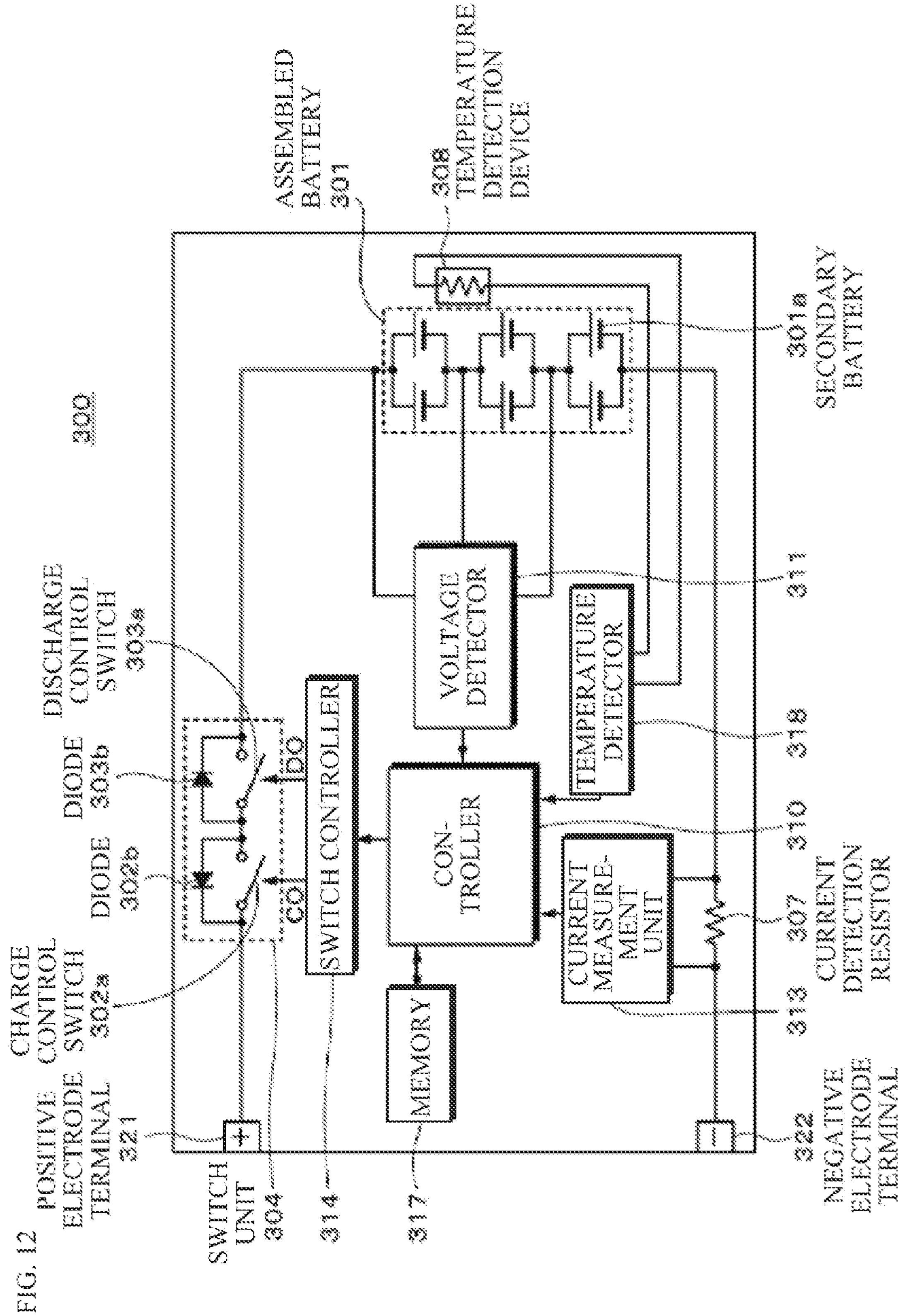
FIG. 12 is a coupling diagram for use to describe a battery pack as an application example according to an embodiment.

FIG. 12 is a block diagram illustrating a circuit configuration example where the battery (hereinafter referred to as the secondary battery, as appropriate) according to an embodiment is applied to a battery pack 300. The battery pack 300 includes an assembled battery 301, an outer package, a switch unit 304, a current detection resistor 307, a temperature detection device 308, and a controller 310. The switch unit 304 includes a charge control switch 302*a* and a discharge control switch 303*a*.

The battery pack 300 further includes a positive electrode terminal 321 and a negative electrode terminal 322. Upon charging, the positive electrode terminal 321 and the negative electrode terminal 322 are respectively coupled to a positive electrode terminal and a negative electrode terminal of a charger to perform charging. Upon use of electronic equipment, the positive electrode terminal 321 and the negative electrode terminal 322 are respectively coupled to a positive electrode terminal and a negative electrode terminal of the electronic equipment to perform discharging.

The assembled battery 301 includes multiple secondary batteries 301*a* coupled in series or in parallel. The secondary battery according to an embodiment is applicable to the secondary battery 301*a*. Note that FIG. 12 illustrates an example case in which six secondary batteries 301*a* are coupled in a two parallel coupling and three series coupling (2P3S) configuration; however, the secondary batteries 301*a* may be coupled in any other manner such as in any u parallel coupling and v series coupling configuration, where u and v are integers.

The switch unit 304 includes the charge control switch 302*a*, a diode 302*b*, the discharge control switch 303*a*, and a diode 303*b*, and is controlled by the controller 310. The diode 302*b* has a polarity that is in a reverse direction with respect to a charging current flowing in a direction from the positive electrode terminal 321 to the assembled battery 301, and in a forward direction with respect to a discharging current flowing in a direction from the negative electrode terminal 322 to the assembled battery 301. The diode 303*b* has a polarity that is in the forward direction with respect to the charging current and in the reverse direction with respect to the discharging current. Note that although the switch unit 304 is provided on a positive side in this example, the switch unit 304 may be provided on a negative side.

The charge control switch 302*a* is controlled by a charge-discharge controller in such a manner that, when a battery voltage reaches an overcharge detection voltage, the charge control switch 302*a* is turned off to thereby prevent the charging current from flowing through a current path of the assembled battery 301. After the charge control switch 302*a* is turned off, only discharging is enabled through the diode 302*b*. Further, the charge control switch 302*a* is controlled by the controller 310 in such a manner that, when a large current flows upon charging, the charge control switch 302*a* is turned off to thereby cut off the charging current flowing through the current path of the assembled battery 301.

The discharge control switch 303*a* is controlled by the controller 310 in such a manner that, when the battery voltage reaches an overdischarge detection voltage, the discharge control switch 303*a* is turned off to thereby prevent the discharging current from flowing through the current path of the assembled battery 301. After the discharge control switch 303*a* is turned off, only charging is enabled through the diode 303*b*. Further, the discharge control switch 303*a* is controlled by the controller 310 in such a manner that, when a large current flows upon discharging, the discharge control switch 303*a* is turned off to thereby cut off the discharging current flowing through the current path of the assembled battery 301.

The temperature detection device 308 is, for example, a thermistor. The temperature detection device 308 is provided in the vicinity of the assembled battery 301, measures a temperature of the assembled battery 301, and supplies the measured temperature to the controller 310. A voltage detector 311 measures a voltage of the assembled battery 301 and a voltage of each of the secondary batteries 301*a* included therein, performs A/D conversion on the measured voltages, and supplies the converted voltages to the controller 310. A current measurement unit 313 measures currents using the current detection resistor 307, and supplies the measured currents to the controller 310.

A switch controller 314 controls the charge control switch 302*a* and the discharge control switch 303*a* of the switch unit 304 based on the voltages and the currents respectively supplied from the voltage detector 311 and the current measurement unit 313. When the voltage of any of the secondary batteries 301*a* reaches the overcharge detection voltage or becomes lower than or equal to the overdischarge detection voltage, or when a large current flows suddenly, the switch controller 314 transmits a control signal to the switch unit 304 to thereby prevent overcharging, overdischarging, or overcurrent charging and discharging.

For example, when the secondary battery is a lithium-ion secondary battery, the overcharge detection voltage is determined to be, for example, 4.20 V±0.05 V, and the overdischarge detection voltage is determined to be, for example, 2.4 V±0.1 V.

For example, semiconductor switches such as MOSFETs may be used as the charge and discharge control switches. In this case, parasitic diodes of the MOSFETs serve as the diodes 302*b* and 303*b*. When P-channel FETs are used as the charge and discharge control switches, the switch controller 314 supplies control signals DO and CO to respective gates of the charge control switch 302*a* and the discharge control switch 303*a*. When the charge control switch 302*a* and the discharge control switch 303*a* are of the P-channel type, they are turned on by a gate potential lower than a source potential by a predetermined value or more. That is, in normal charging and discharging operations, the control signals CO and DO are set to a low level, and the charge control switch 302*a* and the discharge control switch 303*a* are turned on.

In addition, upon overcharging or overdischarging, for example, the control signals CO and DO are set to a high level, and the charge control switch 302*a* and the discharge control switch 303*a* are turned off.

The memory 317 includes a RAM and a ROM, and includes, for example, an erasable programmable read only memory (EPROM) which is a nonvolatile memory. In the memory 317, for example, a numerical value calculated by the controller 310, an internal resistance value of the battery in an initial state for each of the secondary batteries 301*a* measured in the manufacturing process stage, and other values are stored in advance, and are rewritable on an as-needed basis. Further, by storing a full charge capacity of the secondary battery 301*a* in the memory 317, it is possible to calculate, for example, a remaining capacity with the controller 310.

A temperature detector 318 measures a temperature using the temperature detection device 308, performs charge and discharge control upon abnormal heat generation, and performs correction in calculating the remaining capacity.

The secondary battery according to an embodiment described above is mountable on, or usable to supply electric power to, for example, any of equipment including, without limitation, electronic equipment, an electric vehicle, an electric aircraft, and a power storage apparatus.

Examples of the electronic equipment include laptop personal computers, smartphones, tablet terminals, personal digital assistants (PDAs) (mobile information terminals), mobile phones, wearable terminals, cordless phone handsets, hand-held video recording and playback devices, digital still cameras, electronic books, electronic dictionaries, music players, radios, headphones, game machines, navigation systems, memory cards, pacemakers, hearing aids, electric tools, electric shavers, refrigerators, air conditioners, televisions, stereos, water heaters, microwave ovens, dishwashers, washing machines, dryers, lighting equipment, toys, medical equipment, robots, road conditioners, and traffic lights.

Examples of the electric vehicle include railway vehicles, golf carts, electric carts, and electric automobiles including hybrid electric automobiles. The secondary battery according to an embodiment is usable as a driving power source or an auxiliary power source for any of these electric vehicles. Examples of the power storage apparatuses include a power storage power source for architectural structures including residential houses, or for power generation facilities.

Figure 13:
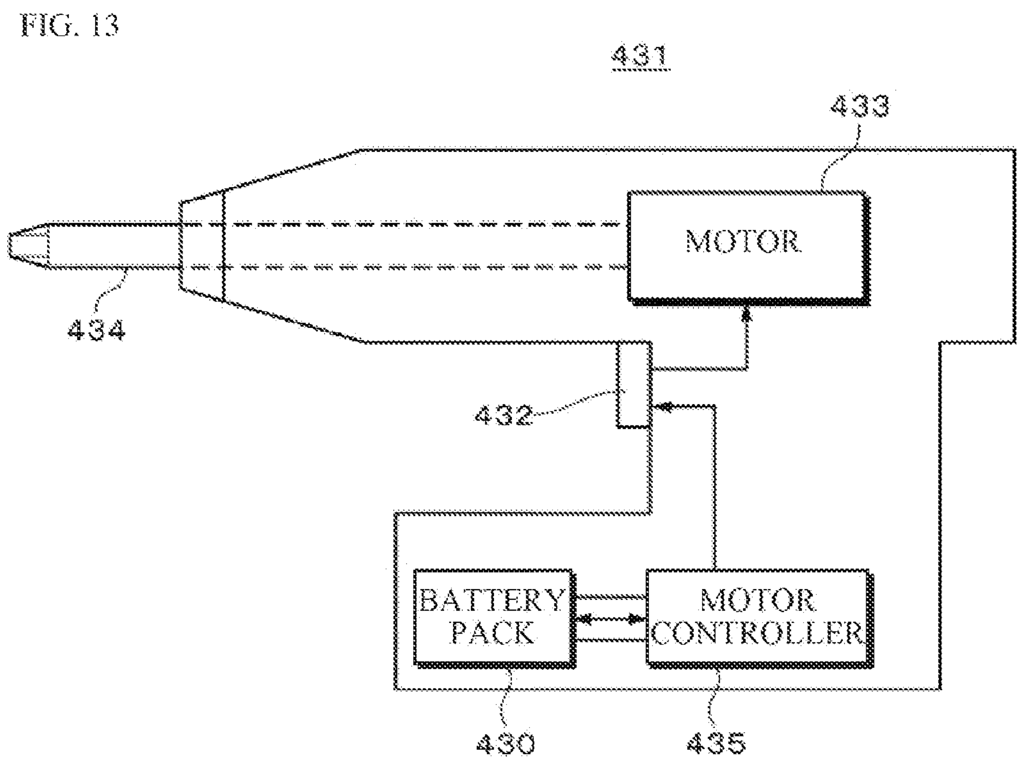
FIG. 13 is a coupling diagram for use to describe an electric tool as an application example according to an embodiment.

An example of the electric tools to which the present application is applicable, e.g., an electric screwdriver, will be schematically described with reference to FIG. 13. An electric screwdriver 431 has a body in which a motor 433 such as a DC motor is contained. Rotation of the motor 433 is transmitted to a shaft 434, and the shaft 434 drives a screw into a target object. The electric screwdriver 431 is provided with a trigger switch 432 to be operated by a user.

A battery pack 430 and a motor controller 435 are contained in a lower housing of a handle of the electric screwdriver 431. The secondary battery according to an embodiment is usable as the battery pack 430. The motor controller 435 controls the motor 433. Each component of the electric screwdriver 431 other than the motor 433 may be controlled by the motor controller 435. Although not illustrated, the battery pack 430 and the electric screwdriver 431 are engaged with each other by respective engaging members provided therein. The battery pack 430 and the motor controller 435 include respective microcomputers. Battery power is supplied from the battery pack 430 to the motor controller 435, and the respective microcomputers of the battery pack 430 and the motor controller 435 communicate with each other to transmit and receive data on the battery pack 430.

The battery pack 430 is, for example, detachably attached onto the electric screwdriver 431. The battery pack 430 may be built in the electric screwdriver 431. The battery pack 430 is attached onto a charging device at the time of charging. When the battery pack 430 is attached onto the electric screwdriver 431, a portion of the battery pack 430 may be exposed to the outside of the electric screwdriver 431 to allow the exposed portion to be visible to the user. For example, the exposed portion of the battery pack 430 may be provided with an LED to allow the user to check light emission and extinction of the LED.

The motor controller 435 controls, for example, rotation and stopping of the motor 433 and a rotation direction of the motor 433. Furthermore, the motor controller 435 cuts off power supply to a load upon overdischarging. For example, the trigger switch 432 is interposed between the motor 433 and the motor controller 435. Upon pressing of the trigger switch 432 by the user, power is supplied to the motor 433 to cause the motor 433 to rotate. Upon returning of the trigger switch 432 by the user, the rotation of the motor 433 stops.

Figure 14:
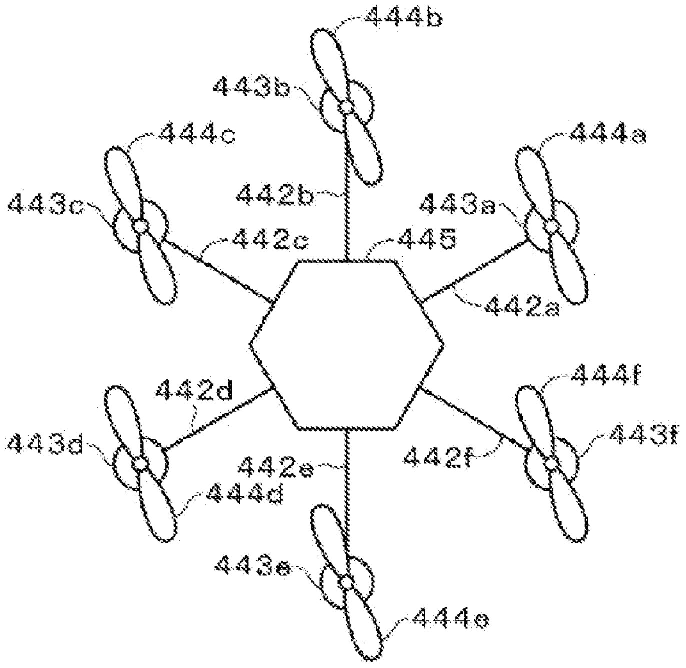
FIG. 14 is a coupling diagram for use to describe an unmanned aircraft as an application example according to an embodiment.

An example in which the secondary battery according to an embodiment is applied to a power source for an electric aircraft will be described with reference to FIG. 14. The secondary battery is applicable to a power source for an unmanned aircraft, i.e., a so-called drone. FIG. 14 is a plan view of the unmanned aircraft. The unmanned aircraft has an airframe including a cylindrical or prismatic fuselage part as a center part, and support shafts 442*a* to 442*f* fixed to an upper portion of the fuselage part. As one example, the fuselage part has a hexagonal prismatic shape, and six support shafts 442*a* to 442*f* extend radially from a center of the fuselage part at equal angular intervals. The fuselage part and the support shafts 442*a* to 442*f* include a lightweight and high-strength material.

Motors 443*a* to 443*f* as drive sources for rotary wings are attached to respective tip parts of the support shafts 442*a* to 442*f*. Rotary wings 444*a* to 444*f* are attached to respective rotary shafts of the motors 443*a* to 443*f*. A circuit unit 445 including a motor control circuit for controlling each motor is attached to the center part, i.e., the upper portion of the fuselage part where the support shafts 442*a* to 442*f* intersect.

Further, an unillustrated battery unit as a power source is disposed at a position below the fuselage part. The battery unit includes three battery packs to supply electric power to pairs of motors and rotary wings that have an opposing interval of 180 degrees. Each battery pack includes, for example, a lithium-ion secondary battery and a battery control circuit that controls charging and discharging. The secondary battery according to an embodiment is usable as the battery pack. A combination of the motor 443*a* and the rotary wing 444*a* and a combination of the motor 443*d* and the rotary wing 444*d* pair up with each other. In the same manner, a combination of the motor 443*b* and the rotary wing 444*b* and a combination of the motor 443*e* and the rotary wing 444*e* pair up with each other; and a combination of the motor 443*c* and the rotary wing 444*c* and a combination of the motor 443*f* and the rotary wing 444*f* pair up with each other. The number of these pairs and the number of the battery packs are equal.

Figure 15:
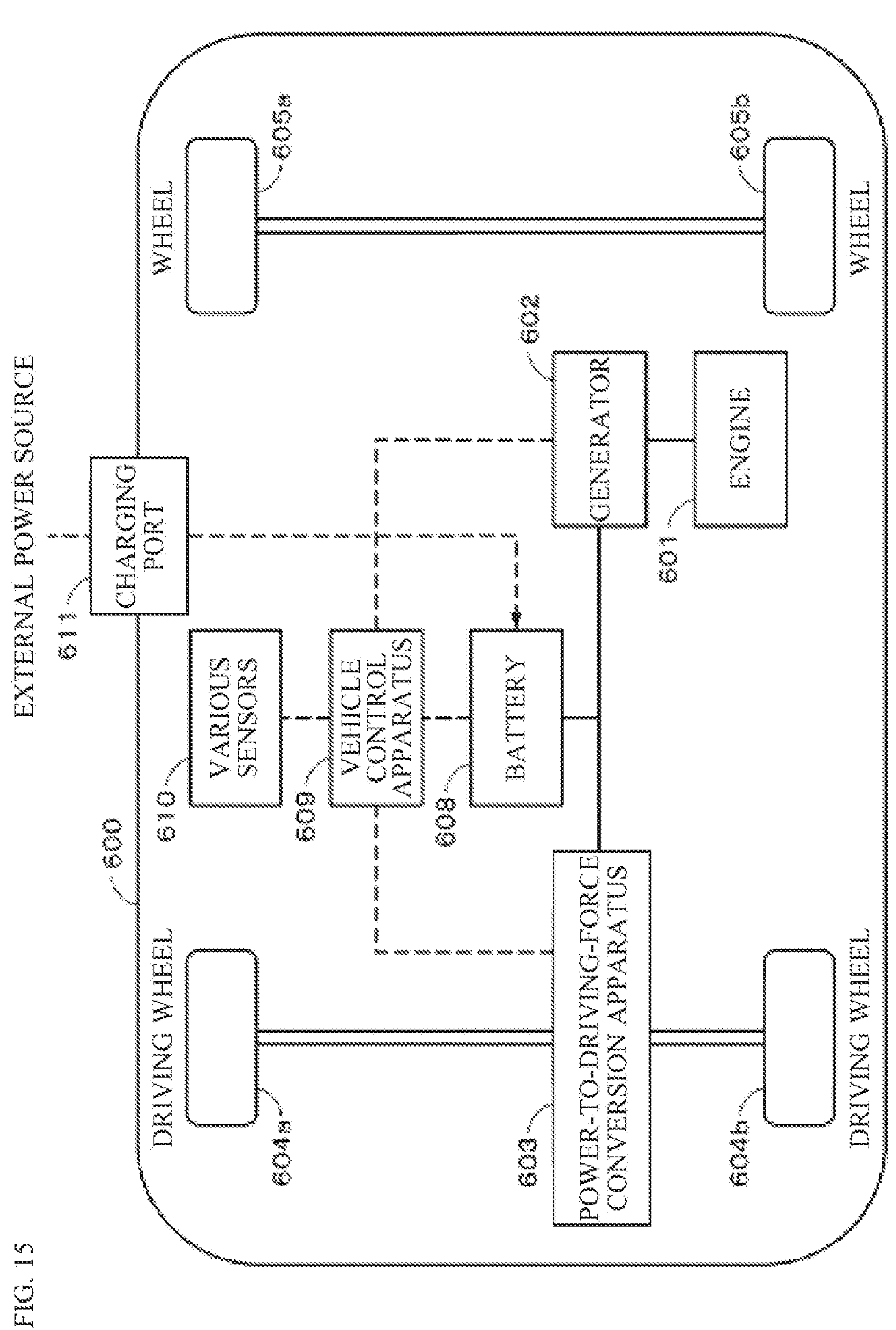
FIG. 15 is a coupling diagram for use to describe an electric vehicle as an application example according to an embodiment.

An example in which the present technology is applied to a power storage system for an electric vehicle will be described with reference to FIG. 15. FIG. 15 schematically illustrates an example of a configuration of a hybrid vehicle that employs a series hybrid system to which the invention is applicable. The series hybrid system relates to a vehicle that travels with an electric-power-to-driving-force conversion apparatus, using electric power generated by a generator driven by an engine or using electric power temporarily stored in a battery.

A hybrid vehicle 600 is equipped with an engine 601, a generator 602, an electric-power-to-driving-force conversion apparatus 603, a driving wheel 604*a*, a driving wheel 604*b*, a wheel 605*a*, a wheel 605*b*, a battery 608, a vehicle control apparatus 609, various sensors 610, and a charging port 611. The secondary battery described above is applicable to the battery 608.

The hybrid vehicle 600 travels with the electric-power-to-driving-force conversion apparatus 603 as a power source. An example of the electric-power-to-driving-force conversion apparatus 603 is a motor. The electric-power-to-driving-force conversion apparatus 603 operates under the electric power of the battery 608, and a rotational force of the electric-power-to-driving-force conversion apparatus 603 is transmitted to the driving wheels 604*a* and 604*b*. It is to be noted that both an alternating-current motor and a direct-current motor are applicable as the electric-power-to-driving-force conversion apparatus 603 by using direct-current-to-alternating-current (DC-to-AC) conversion or reverse conversion (AC-to-DC conversion) at a location where such conversion is necessary. The various sensors 610 control an engine speed via the vehicle control apparatus 609, and control an opening angle, i.e., a throttle position, of an unillustrated throttle valve. The various sensors 610 include a speed sensor, an acceleration sensor, and an engine speed sensor.

A rotational force of the engine 601 is transmitted to the generator 602, and electric power generated by the generator 602 using the rotational force is storable in the battery 608.

When the hybrid vehicle 600 is decelerated by an unillustrated brake mechanism, a resistance force at the time of deceleration is applied to the electric-power-to-driving-force conversion apparatus 603 as a rotational force, and regenerative electric power generated by the electric-power-to-driving-force conversion apparatus 603 from the rotational force is stored in the battery 608.

By being coupled to a power source external to the hybrid vehicle 600, the battery 608 is able to be supplied with electric power from the external power source via the charging port 611 as an input port, and to store the supplied electric power.

Although not illustrated, the hybrid vehicle 600 may be provided with an information processor that performs information processing related to vehicle control, based on information on the secondary battery. Examples of such an information processor include an information processor that displays a remaining battery level, based on information related to the remaining level of the battery.

The description above has dealt with, as an example, a series hybrid vehicle that travels by means of the motor using electric power generated by the generator driven by the engine, or using electric power temporarily stored in the battery. However, the present technology is also effectively applicable to a parallel hybrid vehicle which uses outputs of both an engine and a motor as driving sources and appropriately switches between three traveling modes, i.e., traveling only by means of the engine, traveling only by means of the motor, and traveling by means of the engine and the motor. Furthermore, the present technology is also effectively applicable to a so-called electric vehicle which travels by being driven by only a driving motor without the use of an engine.

Reference Signs List

1: lithium ion battery
11: battery can
11A: bottom part of battery can
12: insulator
21: positive electrode
21A: positive electrode foil
21B: positive electrode active material layer
21C: positive electrode active material uncovered part
22: negative electrode
22A: negative electrode foil
22B: negative electrode active material layer
22C: negative electrode active material uncovered part
23: separator
24: positive electrode current collector plate
26: through hole
41, 42: end face
43: groove
72: flat surface
221A: first negative electrode active material uncovered part
221B: second negative electrode active material uncovered part
221C: third negative electrode active material uncovered part It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
an electrode wound body including a positive electrode having a band shape and a negative electrode having a band shape, the positive electrode and the negative electrode being stacked with a separator interposed therebetween;
a positive electrode current collector plate; and
a battery can containing the electrode wound body and the positive electrode current collector plate, wherein
the positive electrode includes, on a positive electrode foil having a band shape, a positive electrode active material covered part covered with a positive electrode active material layer, and a positive electrode active material uncovered part,
the negative electrode includes, on a negative electrode foil having a band shape, a negative electrode active material covered part covered with a negative electrode active material layer, and a negative electrode active material uncovered part extending at least in a longitudinal direction of the negative electrode foil,
the electrode wound body has a flat surface, in which portions of the negative electrode active material uncovered part are bent toward a central axis of the wound structure and overlap with each other in layers to form the flat surface at an end face orthogonal to a central axis of the wound structure,
the flat surface and a bottom part of the battery can are coupled to each other, and
the secondary battery satisfies $0.05 \leq Z \leq 0.5$, Z being equal to $t \times m/T$, where t represents a thickness of the negative electrode foil in millimeters, m represents a number of the layers of the negative electrode active material uncovered part at a coupled portion farthest from the central axis, and T represents a thickness of the bottom part of the battery can in millimeters.

2. The secondary battery according to claim 1, wherein the secondary battery satisfies m≥2.

3. The secondary battery according to claim 1, wherein the end face, on at least a negative electrode side, of the electrode wound body has a groove.

4. The secondary battery according to claim 1, wherein the negative electrode further includes a negative electrode active material uncovered part at an end part in the longitudinal direction on each of a beginning side of winding and an end side of the winding.

5. Electronic equipment comprising the secondary battery according to claim 1.

6. An electric tool comprising the secondary battery according to claim 1.

* * * * *